United States Patent [19]

Fujioka

[11] 4,359,676

[45] Nov. 16, 1982

[54] CONTROL SYSTEM FOR STOPPING SPINDLE AT PREDETERMINED ROTATIONAL POSITION

[75] Inventor: Yoshiki Fujioka, Hino, Japan

[73] Assignee: Fujitsu Fanuc Limited, Tokyo, Japan

[21] Appl. No.: 215,631

[22] Filed: Dec. 12, 1980

[30] Foreign Application Priority Data

Dec. 31, 1979 [JP] Japan .................. 54-172685

[51] Int. Cl.$^3$ .......................................... G05B 1/06
[52] U.S. Cl. .................................. 318/653; 318/466; 318/571; 82/2 B
[58] Field of Search .............. 318/466, 653, 592, 571; 82/2 B

[56] References Cited

U.S. PATENT DOCUMENTS

| | | | |
|---|---|---|---|
| 2,537,269 | 1/1951 | Harding | 318/466 X |
| 2,753,502 | 7/1956 | Kylin | 318/466 X |
| 2,790,280 | 4/1957 | Wilson et al. | 318/466 X |
| 3,293,417 | 12/1966 | Heissmeier | 318/592 |
| 4,206,392 | 6/1980 | Shimajiri et al. | 318/571 X |
| 4,227,134 | 10/1980 | Haner | 318/571 X |

Primary Examiner—B. Dobeck
Attorney, Agent, or Firm—Staas & Halsey

[57] ABSTRACT

A control system for stopping a spindle at a predetermined rotational position, for driving a spindle in such a manner that a positional deviation between the present rotational position of a specified point on the spindle and a predetermined rotational position at which the specified point is to be stopped, is reduced to zero, thereby to stop the specified point on the spindle at the predetermined rotational position. First and second rotational position sensors are attached to the spindle at first and second specified points thereof, the position at which at least the first rotational position sensor is attached being adjustable. Further provided are changeover means and an orientation control circuit. The first position sensor produces a rotational position deviation signal when a tool is inserted into and withdrawn from a workpiece at the time of a boring operation, and the second position sensor produces a rotational position deviation signal when tools are changed. These deviation signals are applied to the orientation control circuit selectively by the changeover means. As a result, the orientation control circuit controls the rotation of the spindle so as to reduce to zero the difference between an average speed signal, which conforms to the actual rotational speed of the spindle, and each of the deviation signals, whereby a specified point on the spindle is stopped at a predetermined rotational position.

8 Claims, 21 Drawing Figures

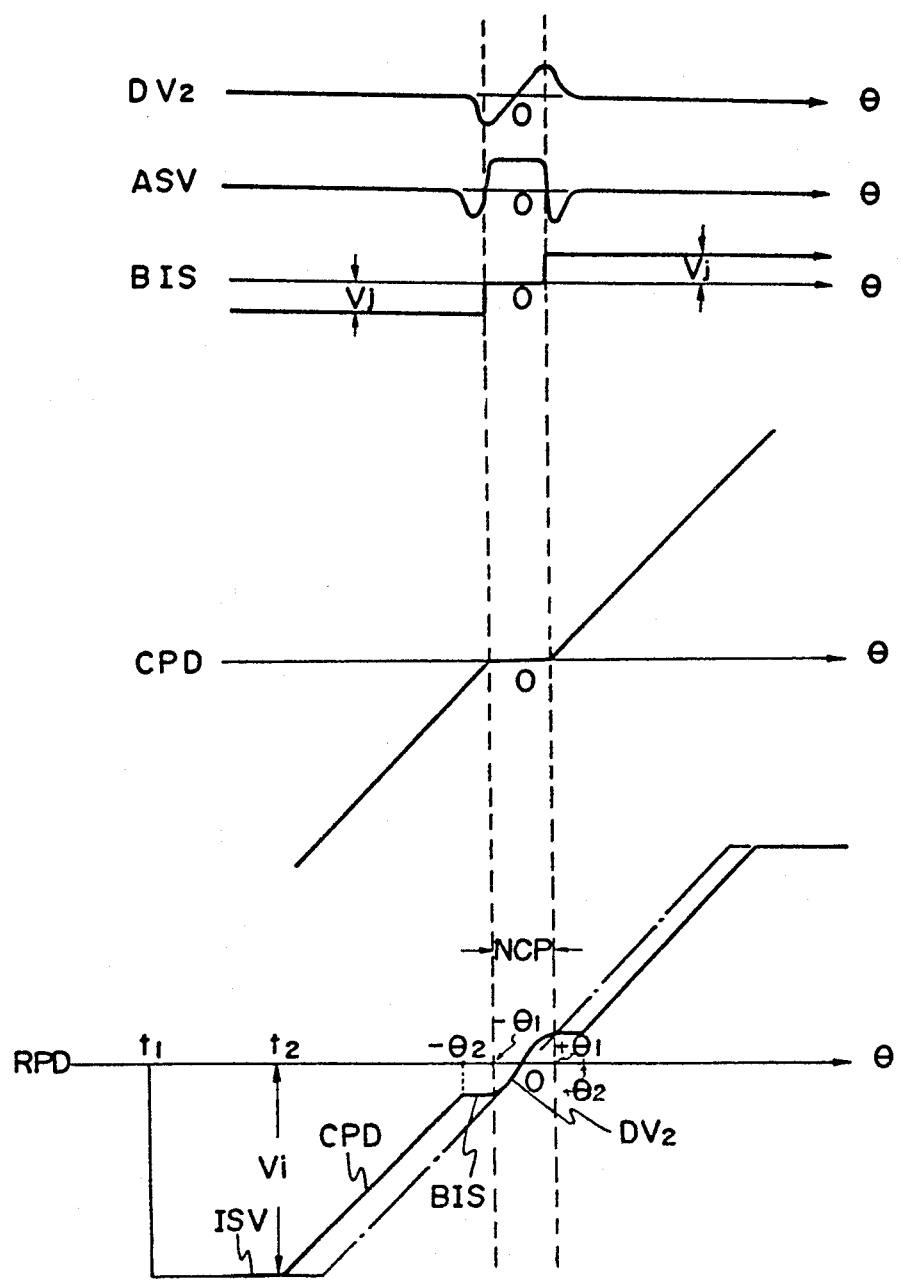

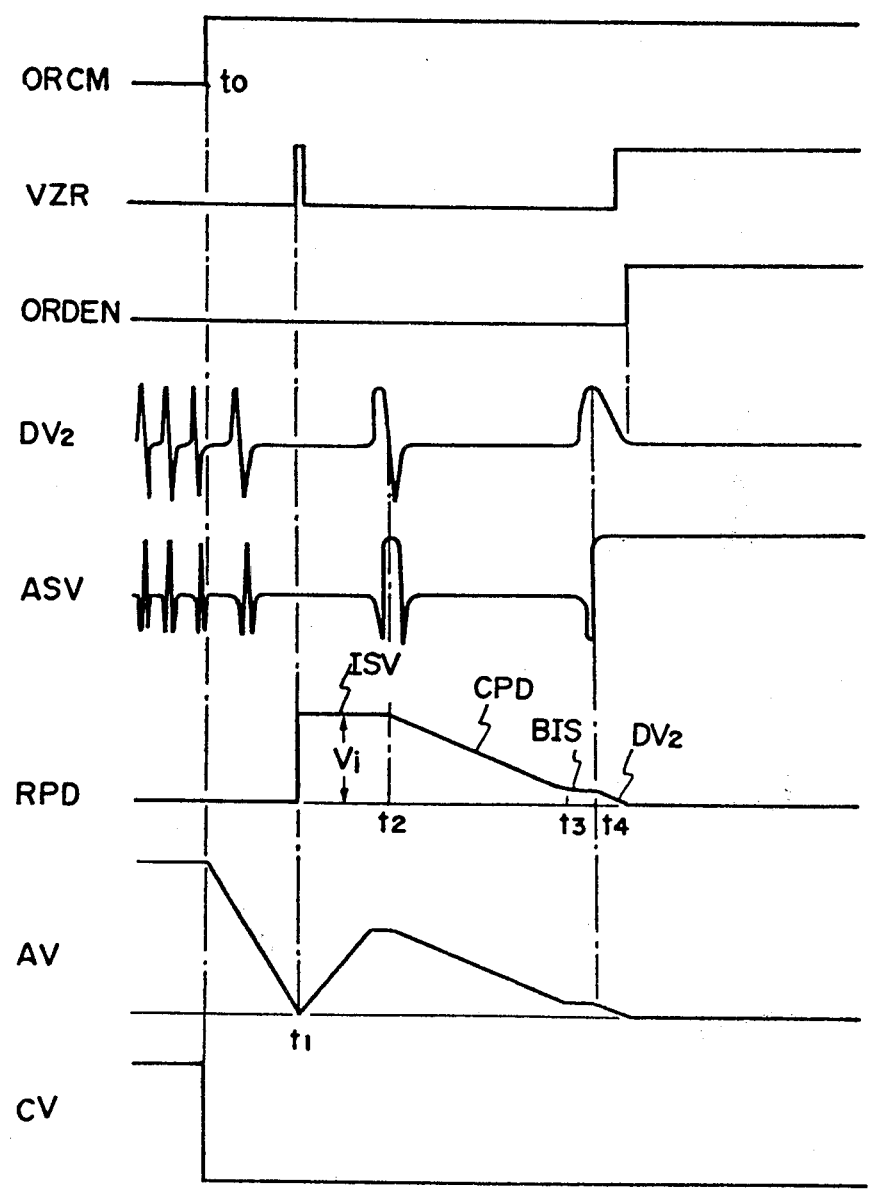

CONTROL SYSTEM FOR STOPPING SPINDLE AT PREDETERMINED ROTATIONAL POSITION

CROSS REFERENCE TO RELATED APPLICATION

This application is related to U.S. Application Ser. No. 190,659, filed Sept. 25, 1980, entitled SPINDLE ROTATION CONTROL SYSTEM, and assigned to the assignee of the present application.

BACKGROUND OF THE INVENTION

This invention relates to a system for stopping a spindle at a predetermined rotational position, and more particularly to a system for stopping a specified point on a sprindle at either of two predetermined rotational positions.

Some machine tools which are known in the art have an automatic tool changing function which allows machining to be performed while a variety of tools mounted on the machine are interchanged automatically. The tool changing operation proceeds as follows. First, a magazine holding a number of tools is revolved to bring a vacant tool holding portion of the magazine into position directly above a spindle mechanism. The spindle mechanism, which is grasping an old tool to be exchanged for a new one, is then projected forwardly, after which the magazine positioned above the spindle mechanism is lowered to permit the old tool to be received and grasped by the vacant tool holding portion of the magazine. The spindle mechanism is then retracted so that the old tool separates from the spindle, thereby transferring the old tool to the magazine. Next, the magazine is revolved to bring a desired new tool into position in front of the sprindle, and the spindle mechanism is projected forwardly to allow the spindle to receive and to grasp the new tool. Finally the magazine is retracted away from the spindle to complete the tool change operation.

It is required, in the tool change mechanism of the foregoing type, that a prescribed part of the spindle, such as a key member, be stopped accurately at the correct rotational position in order to permit the fitting portions of the spindle and tool to mate with each other smoothly. More specifically, a key is mounted on the spindle and a keyway is formed in the tool in order to mate with the key. The smooth mating of the spindle and tool requires that the spindle be positioned and stopped to provide the correct alignment of key and keyway. Meeting the above requirement necessitates a high spindle positioning accuracy of from ±0.1 to ±0.2 degrees in terms of the angle of rotation of the spindle.

The conventional automatic tool change mechanisms are provided with photoelectric detectors or with limit switch mechanisms which detect the rotational position of the spindle key in order to facilitate the smooth mating of the spindle and tools. The arrangement is such that the spindle is brought to a stop at the prescribed position by the application of a mechanical brake which is actuated in response to a signal from the key position detecting means.

The foregoing apparatus employs a stopping mechanism that experiences wear with a long period of use since the mechanism relies upon a mechanical pin or brake or the like. Such wear, particularly of a brake shoe or pin, makes it progressively more difficult to stop the spindle at the predetermined position, and the result is that the automatic changing of tools cannot proceed smoothly.

Accordingly, there is a need for a control system which is capable of stopping a spindle at a predetermined rotational position with a high degree of accuracy by purely electrical means, i.e., without relying upon a mechanical pin or mechanical brake mechanism to stop the spindle, in performing an automatic tool change operation.

On the other hand, numerically controlled machine tools are being applied increasingly to the boring of such workpieces as automobile engine boxes. Such boring work requires the use of thicker boring bars or cutters in order to prevent chatter by increasing rigidity. There are cases, however, where the use of thicker diametered boring bars cannot be avoided, as in the case of boring a hole whose dimensions are such that the thicker boring bars cannot be inserted. This point will be elaborated on in the following description of a boring machine tool.

FIG. 1 is an illustrative view of a boring machine tool in simplified form, including a headstock 101, a boring bar 102, and a cutting tool 103. A workpiece 104, which is carried on a table 105, has holes 104a, 104a' for receiving the boring bar 102, and a hollow portion 104b. In a boring machine tool of this type, the cutting tool 103 is inserted into the hollow portion 104b of the workpiece 104 through either of the insertion holes 104a or 104a', after which the workpiece 104 is moved relative to the cutting tool 103 to permit the cutting tool 103 to bore the workpiece 104 in a prescribed manner. The holes 104a, 104a', since they are eventually to be covered, are comparatively small in diameter. It is therefore necessary to select a small diameter boring bar 102, as shown in FIG. 2, in order to prevent the cutting tool 103 from contacting the periphery of the hole 104a when the boring bar 102 is inserted into and withdrawn from the interior of the workpiece 104. The use of a small diameter boring bar results in chatter during machining, so that a high degree of accuracy cannot be achieved.

Proposed methods of solving the above problem are shown in FIGS. 3 and 4, wherein arrangements are adopted that permit the utilization of a boring bar 102 having a larger diameter. In accordance with the method of FIG. 3, the center of the boring bar 102 is offset from the center of the hole 104a along the Y-axis when the boring bar is inserted and withdrawn, the cutting tool 103 being positioned so as to coincide with the Y-axis. It should be noted, however, that the choice of the Y-axis here is illustrative only. In accordance with the method of FIG. 4, a cutting tool insertion notch 104c is formed in the workpiece 104 so as to communicate with the insertion hole 104a, and the cutting tool 103 is positioned so as to coincide with the notch 104c when the boring bar is inserted and withdrawn. Both methods depicted in FIGS. 3 and 4 reduce chatter by allowing the use of larger diameter boring bar 102. When the cutting tool 103 is inserted into the workpiece and when its rotation is stopped after a machining operation, both of the above methods require that the spindle of the machine tool be stopped accurately at a predetermined rotational position which is the positive Y-axis in the arrangement of FIG. 3 and the position of the cutting tool insertion slot 104c in the arrangement of FIG. 4. In other words, in order to eliminate chatter and effect a rigid machining operation by employing a larger diameter boring bar, a control system is required through which the spindle mounting the boring bar can be stopped at a predetermined rotational position.

The foregoing control of spindle stopping position is thus required for both automatic tool change and machining operations; and in general, since the positions at which the spindle is stopped differ in each case, there is an additional requirement that the spindle be stoppable at either of two rotational positions.

SUMMARY OF THE INVENTION

Accordingly, it is an object of the present invention to provide a control system for stopping a spindle at a predetermined rotational position, by which a spindle can be stopped at first and second rotational positions at the time of an automatic tool change operation and boring operation, respectively.

It is another object of the present invention to provide a control system for stopping a spindle at a predetermined rotational position, by which a spindle can be stopped at first and second rotational positions with a high degree of accuracy.

It is another object of the present invention to provide a control system for stopping a spindle at a predetermined rotational position, by which a spindle can be stopped at first and second rotational positions by utilizing two novel position sensors that detect rotational position without relying upon physical contact.

It is a further object of the present invention to provide a structurally simple and inexpensive control system for stopping a spindle at a predetermined rotational position, in which a spindle is stopped at first and second rotational positions by a very simple arrangement which includes first and second magnetic sensors mounted on the spindle, a single switching circuit and an orientation circuit.

Other features and advantages of the invention will be apparent from the following description taken in conjunction with the accompanying drawings.

BRIEF DESCRIPTION OF THE DRAWINGS

FIGS. 7(A) and 7(B) are waveform diagrams of signals associated with the block diagram of FIG. 6;

DESCRIPTION OF THE PREFERRED EMBODIMENT

Figure 1:
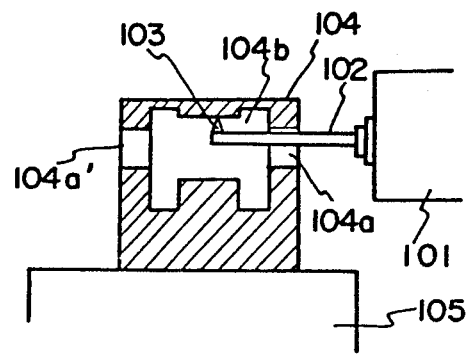
FIG. 1 is an illustrative view showing a boring machine tool in simplified form.
Figure 2:
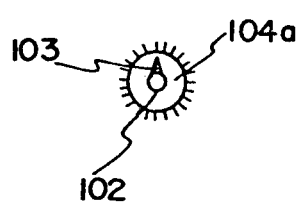
FIG. 2 is an illustrative view showing the positional relationships between a cutting tool, a boring bar and a hole, located in a workpiece, for receiving the cutting tool and boring bar.
Figure 3:
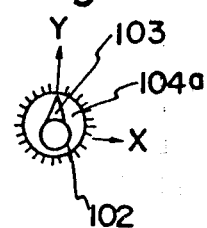
FIGS. 3 and 4 are illustrative views showing methods of inserting a boring bar into a hole located in a workpiece.
Figure 4:
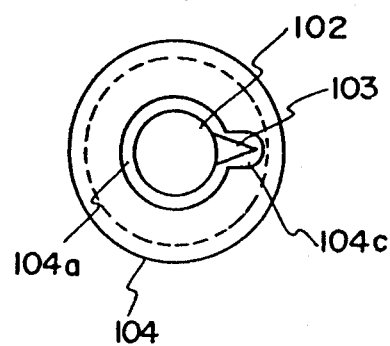
Figure 5A:
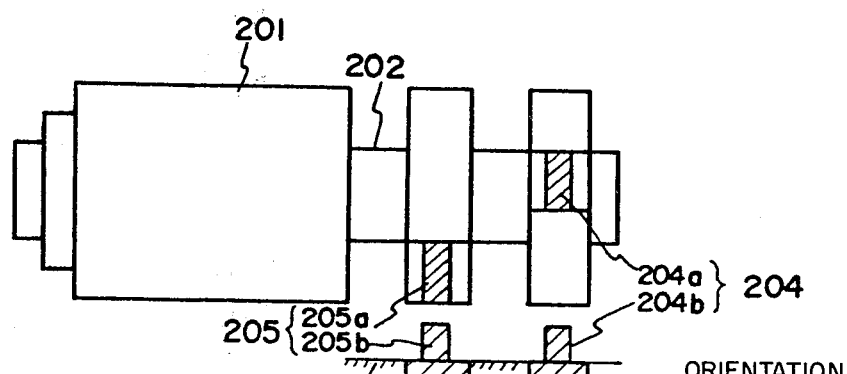
FIG. 5A is an illustrative view which is useful in describing a control system, shown in block diagram form, for stopping a spindle at a predetermined rotational position in accordance with the present invention.
Figure 5B:
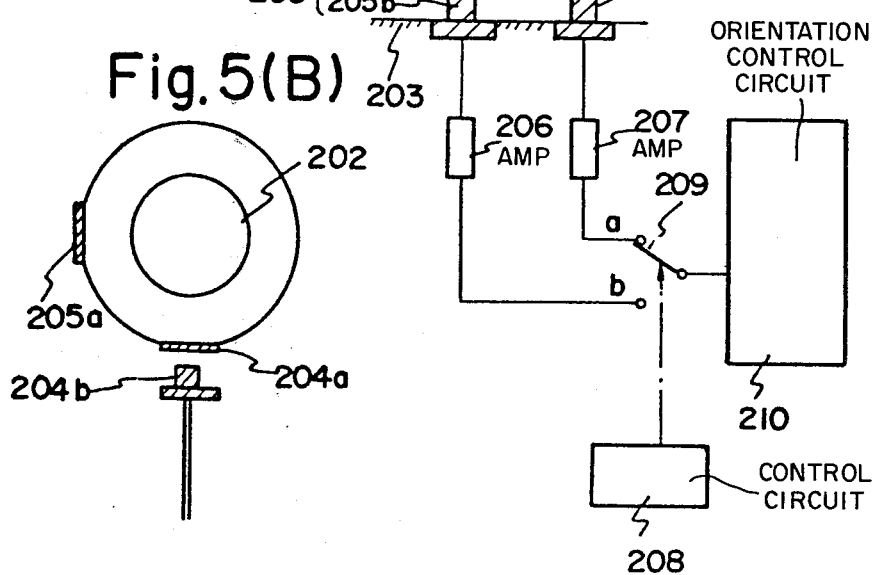
FIG. 5B is an illustrative view which is useful in describing the disposition of position sensors.

Referring now to FIGS. 5A and 5B, first and second position sensors 204, 205 comprise magnetic sensors which, for example, consist of magnetic bodies 204a, 205a and sensing portions 204b, 205b, as will be described in further detail below. The magnetic bodies 204a, 205a are attached to a spindle 202 accommodated by a spindle mechanism 201, and the sensing portions 204b, 205b are fixedly secured to a mechanically stationary portion 203 of the machine tool. The first position sensor 204 is employed in stopping the spindle 202 at a predetermined rotational position at the time of a boring operation, and the second position sensor 205 at the time of an automatic tool change operation. Since the rotational position at which the spindle is stopped during the automatic tool change is fixed, the magnetic body 205a of the second position sensor 205 is fixedly secured to the spindle 202 permanently at the predetermined location. In the case of the boring operation, however, the rotational position at which the sprindle 202 is to be stopped differs depending upon the shape and location of the insertion hole formed in the workpiece. For this reason the magnetic body 204a of the first position sensor 204 is mounted on the spindle 202 in such a manner that it can be set at any desired location. Amplifiers 206, 207 are provided to amplify signals produced by the first and second position sensors 204, 205, and a control circuit 208 instructs a changeover switch 209 to switch between the output of the amplifier 206 and the output of the amplifier 207, the selected output being delivered to an orientation control circuit 210 which will be described below.

When a cutting tool for boring work is inserted into or withdrawn from a workpiece, the changeover switch 209 is connected to the contact a to deliver the amplified output signal from the first position sensor 204 to the orientation control circuit 210 which executes an orientation control operation, in accordance with the received signal, in a manner that will be described below. The orientation control operation stops the spindle 202 in such a manner that the magnetic body 204a attached thereto comes to rest at a position facing the sensing portion 204b. On the other hand, when a tool is to be changed, the changeover switch 209 is connected to the contact b to deliver the amplified output of the second position sensor 205 to the orientation control circuit 210 which executes an orientation control operation, in accordance with the received signal, to stop the spindle 202 so that the magnetic body 205a fixedly secured thereto comes to rest at a position facing the sensing portion 205b.

Reference will now be had to FIGS. 6, 7, 8 and 9.

Provided are a speed command circuit 301 for producing a speed command CV, and an orientation command circuit 302 for producing an orientation command ORCM. A speed control circuit 303 includes an adder 303a, a phase compensating circuit 303b connected to the output of the adder, a voltage-to-phase converter 303c connected to the output of the phase compensating circuit, and a thyristor converter 303d connected to the output of the converter 303c. The adder 303a is adapted to deliver a difference voltage, representative of a speed deviation, between the command speed CV and the actual speed AV of a DC motor 304, during a speed control operation; and to deliver a difference voltage representative of the difference between a rotational position deviation RPD and the actual speed AV during a positional control operation. The phase compensating circuit 303b subjects the output voltage of the adder 303a to a phase compensation by advancing or retarding its phase. The voltage-to-phase converter 303c controls the firing angle of each thyristor in the thyristor converter 303d in accordance with the output voltage of the phase compensating circuit 303b. The thyristor converter 303d operates in accordance with the controlled firing angles of its thyristors to vary the value of the voltage applied to the DC motor 304, thereby regulating the speed at which the motor rotates. As the DC motor 304 rotates, a tachometer 305 generates a voltage in accordance with the motor speed. The rotational motion of the DC motor 304 is transmitted through a gear train 309 or timing belt to a spindle 307 which corresponds to the spindle 202 shown in FIG. 5. The spindle 307 is coupled to a spindle mechanism 306 which mounts a tool 308. Magnetic sensors 310, 310′ correspond to the position sensors 204, 205 shown in FIG. 5, each comprising a magnetic body 310a, a sensing portion 310b and an electrical circuit 310c, as illustrated in FIG. 8.

Figure 8A:
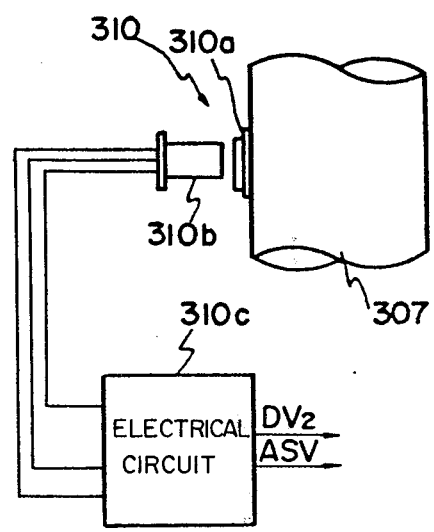
FIGS. 8(A) to 8(D) and 8(F) are diagrams illustrating the magnetic sensor 310 of FIG. 6.
Figure 8B:
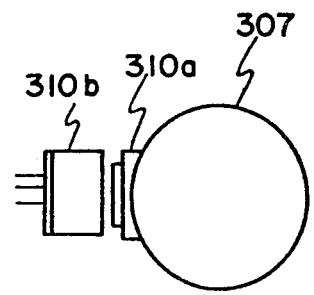
Figure 8C:
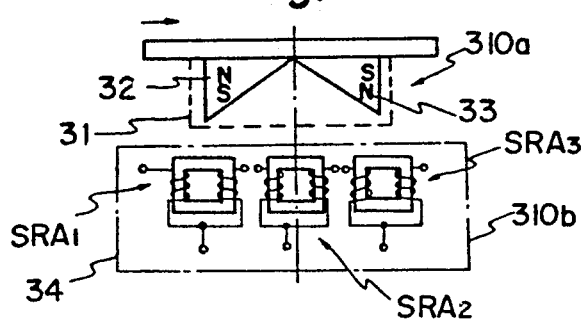
Figure 8D:
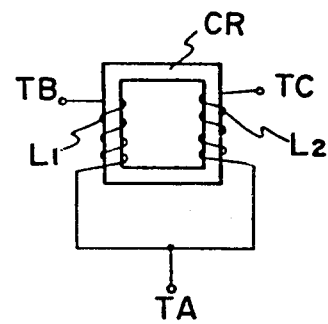

The front and plan views of the position sensor, namely FIGS. 8A and 8B, show the magnetic body 310a mounted on the spindle 307. The magnetic body 310a is mounted on the spindle 307 at an angular position thereof corresponding to the specified point which is to be stopped at the predetermined rotational position. The magnetic body 310a, as shown in FIG. 8C, has magnets 32, 33, possessed of a triangular cross-section, mounted in a case 31 in such a manner that the intensity of the magnetic field changes from S to N in the direction of spindle rotation, i.e., in the direction of the arrow. The sensing portion 310b is mounted on the mechanically stationary portion of the machine so as to confront the magnetic body 310a, and includes three saturable reactors $SRA_1$, $SRA_2$, $SRA_3$ provided in a case 34 and aligned in the direction of spindle rotation, as illustrated in FIG. 8C. Coils $L_1$, $L_2$ are wound on the core CR of each saturable reactor, as depicted in FIG. 8D. The coils $L_1$, $L_2$ on each core CR are so wound as to have opposing polarities. The coils on each core share a common contact TA to which a high-frequency signal is applied, and signals dependent upon the rotational position of the magnetic body 310a are obtained from the terminals $T_B$, $T_C$ of respective coils.

Figure 8E:
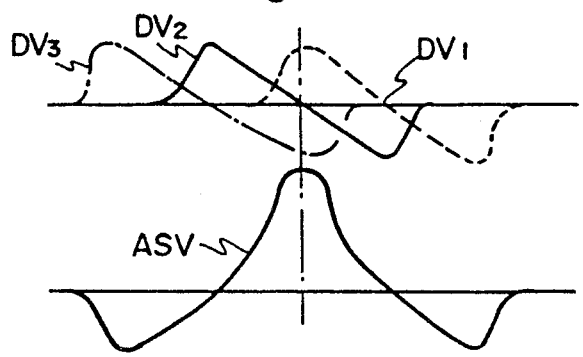
FIG. 8(E) is a waveform diagram of the voltage waveforms generated by the sensing portion 310b of FIG. 8(A)
Figure 8F:
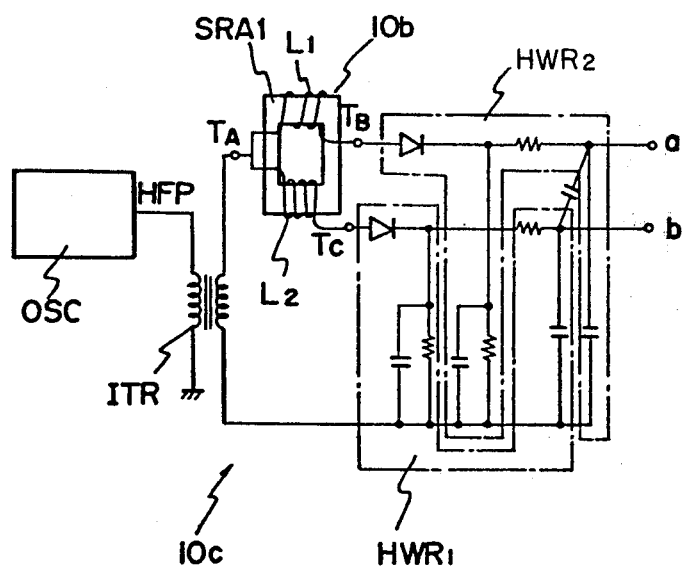

Shown in FIG. 8E are voltage waveforms obtained from sensing circuits, which will be described below, provided for corresponding ones of the saturable reactors $SRA_1$ through $SRA_3$ when the magnetic body 310a and sensing portion 310b have the positional relationship shown in FIG. 8C. Specifically, $DV_1$, $DV_2$, $DV_3$ denote the voltage waveforms from the sensing circuits corresponding to the respective saturable reactors $SRA_1$, $SRA_2$, $SRA_3$. Each of these waveforms has a value of zero volts when the center line of the corresponding saturable reactor $SRA_1$, $SRA_2$, or $SRA_3$ coincides with the center line of the magnetic body 310a. At such time the waveform is positive on one side of the zero value and negative on the other side; that is, it completely crosses the zero level. The voltage waveform ASV is obtained by adding together the voltage $DV_1$ and a voltage which results by subjecting the voltage $DV_3$ to a phase shift of 180 degrees. A sensing circuit corresponding to one of the saturable reactors, namely the reactor $SRA_1$, is shown in detail in FIG. 8F. The sensing circuit, which is provided in the electrical circuit 310c, includes a pulse oscillator OSC for generating a 100 KHz high-frequency pulse signal HFP, an isolating transformer ITR, and half-wave rectifiers $HWR_1$, $HWR_2$. The saturable reactor $SRA_1$ is excited by the high-frequency pulse signal HFP through the intermediary of the isolating transformer ITR. As a result, the output voltage $DV_1$, shown in FIG. 8E, will be obtained across the output terminals a, b of the circuit shown in FIG. 8E, this output voltage being approximately proportional to the external magnetic field $H_{ext}$ whose strength varies in accordance with the rotational position of the magnetic body 310a.

Figure 9A:
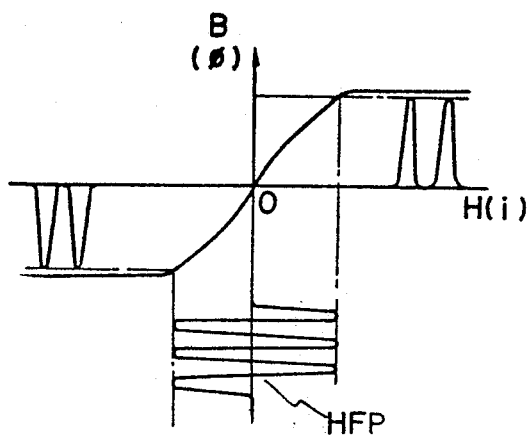
FIGS. 9(A) to 9(D) are graphs for illustrating the operating of the sensing portion 310b of FIG. 8(A)
Figure 9B:
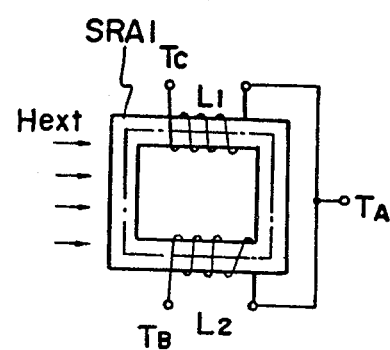
Figure 9C:
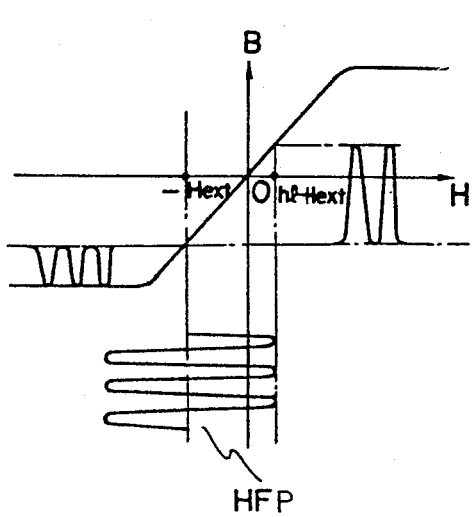
Figure 9D:
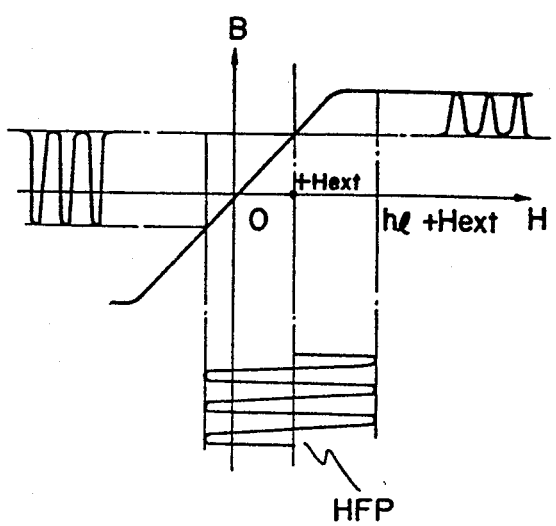

The action of a voltage waveform $DV_1$ obtained across the terminals a, b will now be described with reference to FIG. 9 in connection with the reactor $SRA_1$ on the left side of FIG. 8C. When the magnetic body 310a is remote from the saturable reactor $SRA_1$ so that the external magnetic field acting upon reactor $SRA_1$ has a value of zero, the high-frequency pulse signal HFP acts about the vertical zero line of the reactor B-H curve as its center, as shown in FIG. 9A. As a result, the number of lines of flux cutting the coils $L_1$, $L_2$ are equal, so that the output voltages from the terminals $T_B$, $T_C$ are equal in amplitude but displaced in phase by 180°. It should be noted that since these voltages are rectified by the respective half-wave rectifiers $HWR_1$, $HWR_2$, the potentials at the terminals a, b are equal, so that the voltage across a, b is zero. Now, as the magnetic body 310a approaches the saturable reactor $SRA_1$, the external magnetic field $H_{ext}$ being generated by the magnetic body begins to act upon the reactor $SRA_1$. If we let $h_1$ denote the field generated by the high-frequency pulse signal HFP, a flux in accordance with $h_f$-$H_{ext}$ will cut the coil $L_1$, as shown in FIG. 9C, and a flux in accordance with $h_f$+$H_{ext}$ will cut the coil $L_2$. If this is expressed by a B-H curve, the high-frequency pulse signal HFP will act about the line $-H_{ext}$ as its center with respect to coil $L_1$, as shown in FIG. 9C, and about the line $+H_{ext}$ with respect to coil $L_2$, as depicted in FIG. 9D. Therefore the negatively directed flux which cuts the coil $L_1$ causes saturation of the core so that there is a smaller amount of variation, whereas the negatively directed flux which crosses the coil $L_2$ does not cause saturation so that there is a greater amount of variation. In view of the fact that the induced voltage e takes on the value $(-Nd\phi/dt)$ (where N is the number of turns), the potential at the terminal b will become greater than the potential at the terminal a, giving rise to a potential difference across the terminals. This difference will vary as shown by the curve $DV_1$ in FIG. 8E as the magnetic body 310a continues to rotate. This completes the description of the position detector 310.

Returning now to FIG. 6, a changeover switch 311 is changed over by a command from a control circuit 311′. An orientation control circuit 312, corresponding to the orientation control circuit 210 shown in FIG. 5, includes a rotational position deviation signal generating circuit 312a which produces a rotational position deviation signal RPD of a voltage value in accordance with a rotational position deviation, an orientation completion signal ORDEN, and a zero speed signal VZR which assumes a logical value of "1" when the rotational speed of the spindle falls to zero; and a loop changeover circuit 312b for actuating a loop changeover switch 313b on the basis of the zero speed signal VZR when so instructed by the orientation command ORCM from the orientation command circuit 302. The generation of the rotational position deviation signal RPD will now be described briefly in connection with the waveforms of FIG. 7A, and the rotational position deviation signal generating circuit 312a will be described in detail below.

The rotational position deviation signal generating circuit 312a receives, from the changeover switch 311, the detection voltage $DV_2$ (which is utilized as a fine, as opposed to a coarse, rotational position deviation signal when the spindle is in the vicinity of the predetermined rotational position) corresponding to the saturable reactor $SRA_2$ which is the centrally disposed one in position sensor 310 or 310'. The rotational position deviation signal generating circuit 321a also receives, and an approach signal ASV which is obtained by adding the detection voltage $DV_1$ and the voltage which results by shifting the phase of the detection voltage $DV_3$ by 180°, the detection voltages $DV_1$, $DV_3$ corresponding to the outputs of the saturable reactors $SRA_1$, and $SRA_3$, respectively, on either side of the reactor $SRA_2$. The signal ASV indicates that the spindle has reached an area in the environs of the predetermined rotational position. The signal AV, indicative of the actual speed of the motor, enters the rotational position deviation signal generating circuit 312a from the tachometer 305 and is integrated within the circuity by an integration circuit (not shown). The output (equivalent to the amount of spindle rotation) of the integration circuit is subtracted from an initially set voltage ISV. Thus, the signal AV is converted into a coarse rotational position deviation signal CPD. The voltage value $v_i$ of the voltage ISV is set so as to be equal to a rotational position deviation voltage which corresponds to one revolution (360°) of the spindle. Further, the rotational position deviation signal generating circuit 312a forms a bias signal BIS, retained within the circuit, having an amplitude which is equivalent to the peak value of the fine rotational position deviation signal $DV_2$.

When the speed command CV falls to zero in accordance with an orientation command ORCM from the orientation command circuit 302, the rotational speed of the spindle diminishes and eventually (at time $t_1$) falls to zero (zero speed signal VZR goes to logic "1"). When this occurs, the rotational position deviation signal generating circuit 312a produces the initially set voltage ISV from the time that the zero speed signal VZR goes to logic "1" until the time $t_2$ at which the spindle initially reaches the predetermined rotational position. Thereafter, as the spindle continues to rotate and the magnetic body 310a (the predetermined part of the spindle) approaches the predetermined rotational position for the second time, the coarse position deviation signal CPD is produced until the magnetic body 310a draws near to the area NCP (defined between $-\theta_1$ and $+\theta_2$) in the environs of the predetermined rotational position, that is, until it arrives at the position $-\theta_2$. Furthermore, the bias signal BIS is produced until the abovementioned area NCP is reached. The fine position deviation signal $DV_2$ is generated after the magnetic body 310a has reached and then entered the area NCP in the environs of the predetermined rotational position. The result of these operations is the rotational position deviation signal RPD which is shown in FIG. 7A. It should be noted that the bias signal waveform BIS may be excluded from the signal RPD by setting $\theta_2$ equal to $\theta_1$.

Figure 6:
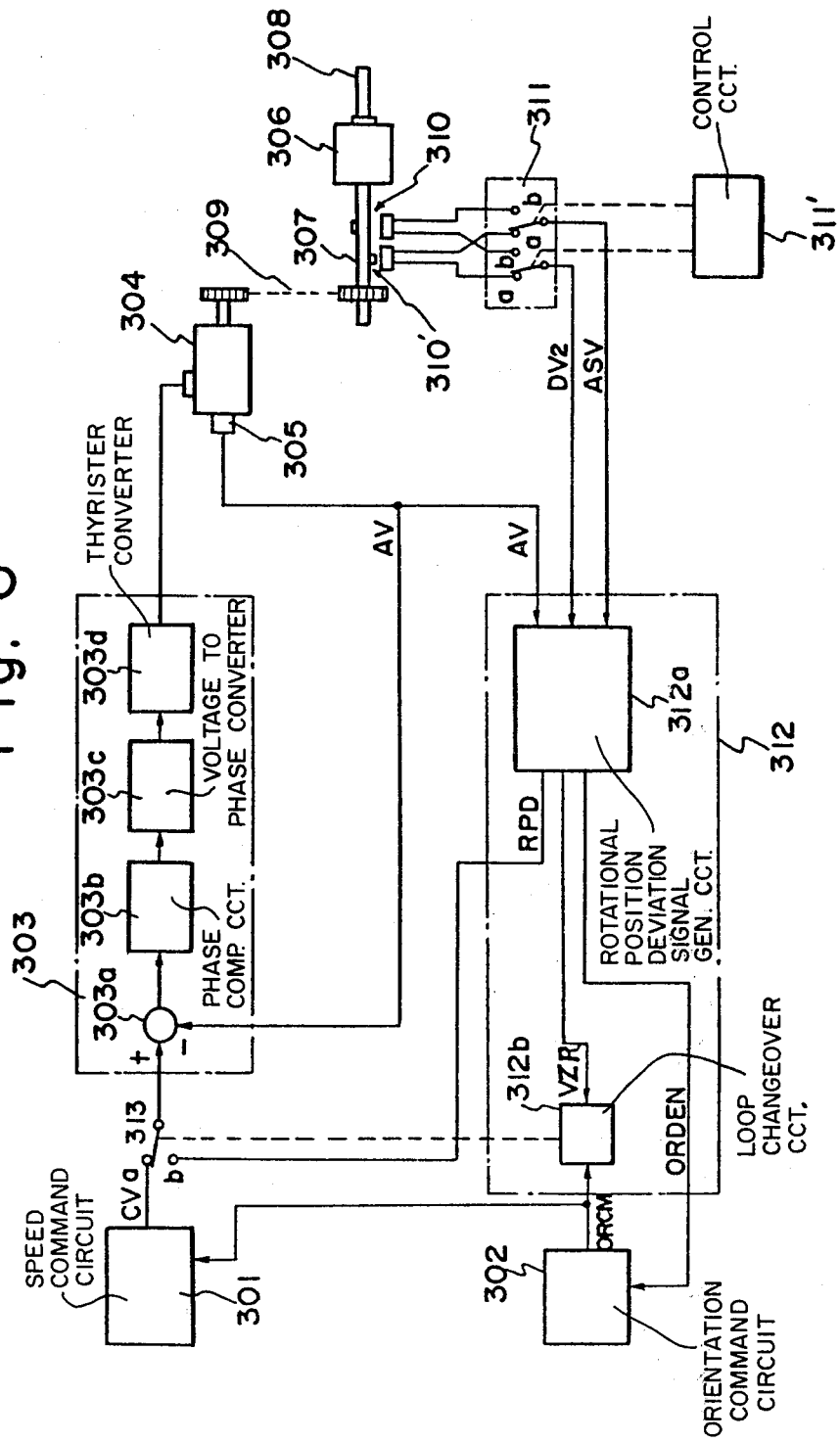
FIG. 6 is a block diagram of a control circuit for stopping a spindle at a predetermined rotational position in accordance with the present invention.

Reference will now be had to FIG. 7B to describe the operation of the control circuit 311', shown in FIG. 6, for stopping the spindle at a predetermined rotational position. It will be assumed that the changeover switch 311 is connected to the contacts a so that the rotational position deviation signal generating circuit 312a is receiving the output of the second magnetic sensor 310' which is used in a tool change operation as mentioned above.

During rotation of the spindle the changeover switch 313 is connected to the a side in FIG. 6, thereby forming a speed control loop. More specifically, the adder 303a receives the speed command signal CV from the speed command circuit 301 and the average speed signal AV from the tachometer 305, and responds by delivering a rotational speed deviation voltage. The voltage-to-phase converter 303c controls the firing angle of the thyristors in the thyristor circuit 303d in accordance with the speed deviation voltage, the thyristor circuit 303d thereby regulating the voltage applied to the DC motor 304. As a result, the actual speed AV of the motor 304 is regulated to bring it into coincidence with the command speed CV. Thereafter the speed control loop regulates the speed of the motor so as to bring the speed deviation toward zero, the spindle rotating while maintaining a constant speed deviation.

When the machining work is completed under these conditions, a numerical control device instructs the orientation command circuit 302 to apply the orientation command signal ORCM to the loop changeover circuit 312b at the time $t_0$. At the same time the orientation command ORCM is applied to the speed command circuit 301, so that the speed command CV drops to zero. The actual speed AV consequently decreases and reaches zero at time $t_1$. When this occurs, the zero speed signal VZR is generated within the position deviation signal generating circuit 312a, and causes the loop changeover circuit 312b to change over the switch 313 to the side b, so that circuit operation now changes from speed control to position control. In response to the zero speed signal VZR, the position deviation signal generating circuit 312a produces first the initially set voltage ISV having the voltage value $V_i$. In response to this signal the spindle begins to rotate again so that the signal AV indicative of the actual speed rises to assume the value $V_i$. As the magnetic body 310a of the second magnetic sensor 310' continues to rotate (FIG. 8) and reaches the predetermined rotational position for the first time ($t_2$), the rotational position deviation signal generating circuit 312a begins generating the coarse position deviation signal CPD. As the spindle continues to rotate and the magnetic body 310a approaches the area NCP (FIG. 7a) in the environs of the predetermined rotational position (time $t_3$), the position deviation signal generating circuit 312a produces the bias signal BIS. Then, when the magnetic body 310a arrives at the abovementioned area NCP (time $t_4$), generation of the fine position deviation signal $DV_2$ starts. When the signal $DV_2$ has decreased to zero, namely when the magnetic body 310a on the predetermined part of the spindle is directly confronting the central saturable reactor $SAR_2$, the spindle stops rotating. This completes positioning control of the spindle.

When the cutting tool is to be inserted into or withdrawn from a workpiece during a boring operation, the changeover switch 311 is switched to the side b by a control signal from the control circuit 311'. Thereafter, an orientation operation identical with that described above in connection with the tool change is executed to stop the spindle at the predetermined rotational position that allows insertion or withdrawal of the cutting tool.

Figure 10:
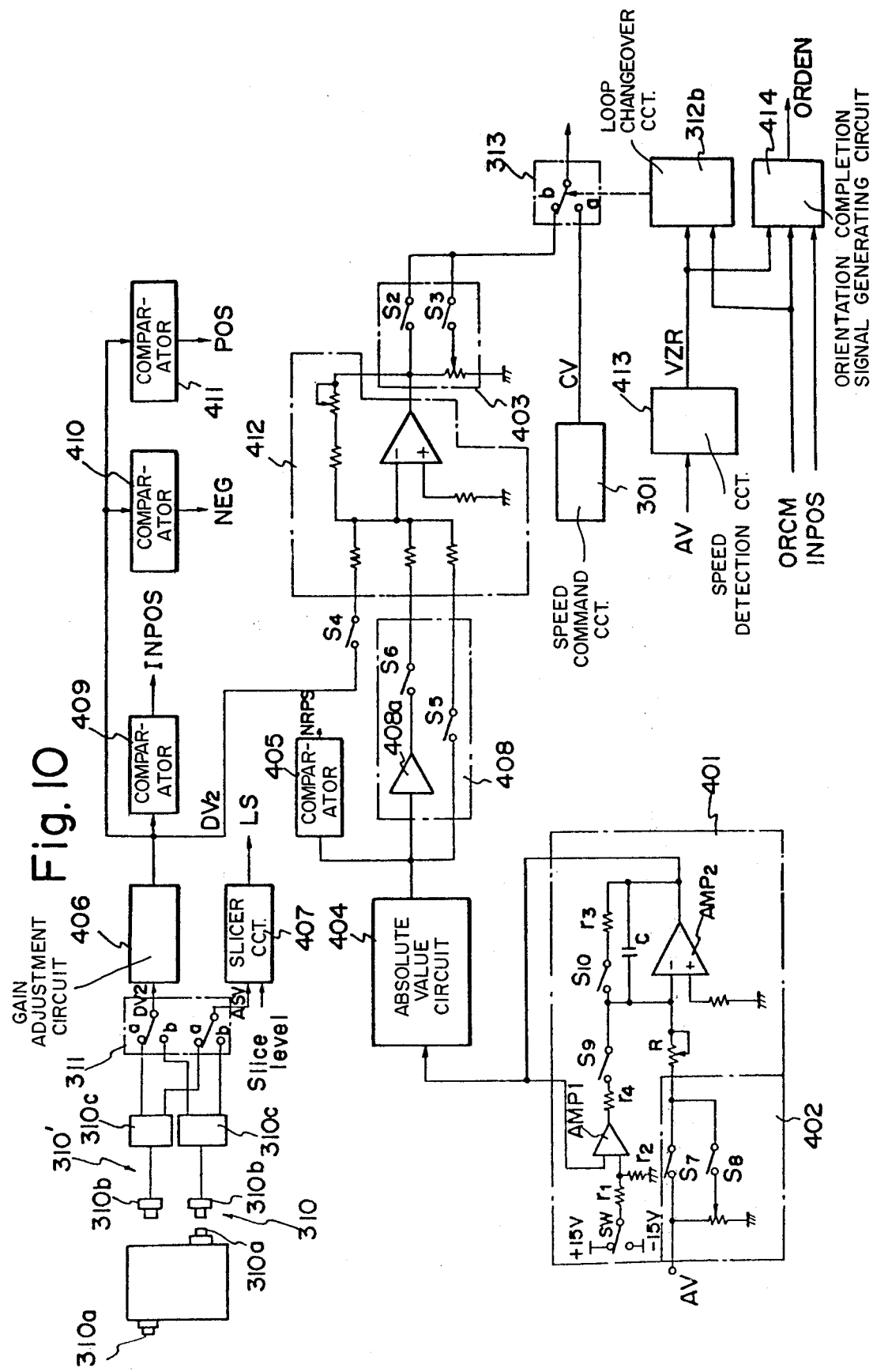
FIG. 10 is a circuit diagram showing the position deviation signal generating circuit 312a of FIG. 6 in detail.
Figure 11:
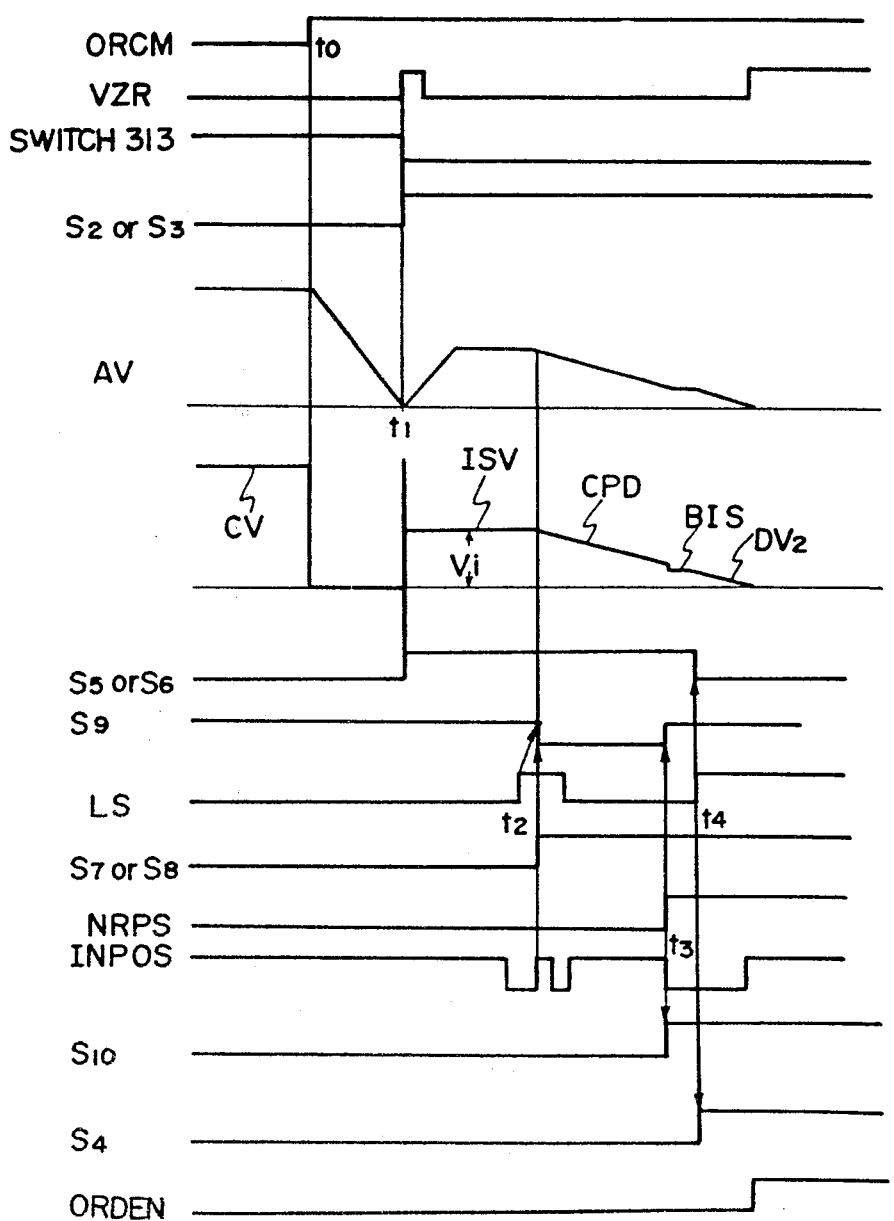
FIG. 11 is a timing chart associated with the circuit of FIG. 10.

The structure of the rotational position deviation signal generating circuit 312a is shown in FIG. 10, and the associated timing chart is illustrated in FIG. 11. Portions in FIG. 10 identical with those of FIG. 6 are denoted by like reference characters and are not described again in order to avoid prolixity.

In FIG. 10, a circuit 401 is provided to form the initially set voltage ISV and the bias signal BIS, to integrate the actual speed voltage signal AV, and to subtract the output voltage, resulting from the integration operation, from the initially set voltage ISV. Specifically, a changeover switch SW is switched over to either a +15 volt side or a −15 volt side in accordance with the direction of spindle rotation. If the spindle is rotating in the forward direction, the connection is to the −15 volt side. This voltage is divided by resistors $r_1$, $r_2$, is passed through an amplifier $AMP_1$, a resistor $r_4$ a switch $S_9$ and a capacitor C. The voltage charged in the capacitor C becomes the value $V_i$ of the initially set voltage ISV. If the actual speed signal AV enters the circuit 401 through a switch $S_8$ or $S_7$ after the switch $S_9$ has been opened, the capacitor C discharges at the time constant RC since the voltage value of the actual speed signal AV is lower than $V_i$, and the coarse position deviation signal CPD, obtained due to the subtraction of the output voltage namely the result of integrating the actual speed signal AV, from the initially set voltage ISV, appears at the output of the amplifier $AMP_2$, the amplifier $AMP_2$, resistor R and capacitor C forming an integration circuit. If the switches $S_9$, $S_{10}$ are closed after the voltage of the signal CPD reaches a specified value $V_j$, the circuit 401 acts as an amplifier, and the bias signal BIS at the specifed level $V_j$ is obtained at the output of the amplifier $AMP_2$. In other words, in accordance with the particular combination and timing of the opening and closing operation of the switches $S_7$ through $S_{10}$, first the initially set voltage ISV is delivered, then the coarse position deviation signal CPD, and finally the bias signal BIS.

Numerals 402, 403 denote changeover circuits for switching gain in accordance with gear ratio. These circuits are operable to set the gain of the position control loop high when the gears between the DC motor 304 and the spindle 307 are set low (reduction ratio high), and to set the gain low when the gears are set high (reduction ratio low), that is, to set the gain low in comparison to the gain for the high reduction ratio. More specifically, when the reduction ratio is high, switches $S_7$, $S_2$ are closed to raise the gain, and when the reduction ratio is low, switches $S_8$, $S_3$ are closed to lower the gain. This eliminates spindle hunting and overshoot when stopping the spindle at the predetermined rotational position, and permits the spindle stopping operation to be completed in less time regardless of the scale of the reduction ratio.

Denoted at 404 is a well-known absolute value circuit which takes the absolute value of the output from the circuit 401. A comparator 405 detects whether or not the coarse position deviation signal CPD has fallen below a predetermined level, and produces a signal NRPS which indicates that the predetermined portion (the magnetic body 310a of either of the sensors 310, 310') has drawn near the area ($-\theta_2$ to $+\theta_2$ in FIG. 7A) in the environs of the predetermined rotational stopping position. The signal NRPS closes the switches $S_9$, $S_{10}$.

A gain adjustment circuit 406 adusts the gain in accordance with the gap between either of the magnetic bodies 310a and the corresponding sensing portions 310b, and produces the detection signal $DV_2$ (the fine position deviation voltage) having a prescribed slope. A slicer circuit 407 slices the approach signal ASV at a predetermined level and produces a signal LS which indicates that either of the magnetic bodies has reached the area NCP (FIG. 7A) in the environs of the predetermined rotational position. The signal LS opens the switches $S_5$, $S_6$ and closes switch $S_4$. As a result, the fine position deviation signal $DV_2$ is delivered as the deviation signal.

A forward-reverse changeover circuit 408 has its switch $S_5$ closed to deliver the output of the absolute value circuit 404 in a case where the spindle is controlled by rotating it in the forward direction, and its switch $S_6$ closed to deliver the output of the absolute value circuit 404 after it has been inverted by the amplifier 408a, in a case where the spindle is controlled by rotating it in the reverse direction. An "in-position" signal generating circuit 409, comprising a comparator, monitors the fine position deviation signal $DV_2$ and generates the in-position signal INPOS when the spindle is within the range of the predetermined rotational position. The signal INPOS is applied to an orientation completion signal generating circuit which will be described later.

Comparators 410, 411 monitor the fine position deviation signal $DV_2$ and produce signals NEG, POS upon detecting whether the spindle is approached the predetermined rotational position while rotating in the reverse direction (signal NEG at logical "1") or while rotating in the forward direction (signal POS at logical "1"), respectively. One of the switches $S_5$, $S_6$ will be closed and the other will be opened by the signals VZR and LS depending upon which of the signals NEG, POS is a "1". A waveform synthesizing circuit 412 delivers either the fine position deviation signal or the coarse position deviation signal in accordance with the open or closed state of the switch $S_4$, $S_5$ or $S_6$. A speed detection circuit 413 receives the voltage AV indicative of the actual speed of the spindle and generates the zero speed signal VZR when AV falls to zero. An orientation completion signal generating circuit 414 receives the in-position signal INPOS, the zero speed signal VZR and the orientation command signal ORCM, and takes the logical product of these signals, thereby producing the orientation completion signal ORDEN when INPOS, VZR and ORCM are all at logic "1".

In summary, if the orientation command ORCM goes to logic "1" at time $t_o$, the command speed CV drops to zero volts, so that the actual speed AV, decreases with AV, dropping to zero volts and the zero speed signal VZR going to logic "1". When this occurs the loop changeover switch 313 is switched over to the side b, one of the switches $S_2$, $S_3$ closes in accordance with the low/high setting of the gears, and one of the switches $S_5$, $S_6$ closes in accordance with the direction, either forward or reverse, of spindle rotation. This forms a position control loop, with the initially set voltage ISV being delivered from the changeover switch 313. It should be noted that the switch $S_9$ is closed, and that switches $S_7$, $S_8$, $S_{10}$ are open. The DC motor 304 shown in FIG. 6 begins rotating again so that the spindle is rotated and reaches the predetermined rotational position the first time (i.e., the signal LS is a "1", and the in-position signal INPOS is a "1"). Hence, at time $t_2$, switch $S_9$ is opened and one of the switches $S_7$, $S_8$ is closed in accordance with the low/high setting of the gears. Therefore the coarse position deviation signal CPD is obtained from the changeover switch 313. Thereafter, as the actual speed AV and the position deviation decrease and the spindle approaches the area in the environs of the predetermined rotational position (time $t_3$), the comparator 405 issues the signal NRPS (logic "1"), whereby the switches $S_9$ and $S_{10}$ are closed. As a result, the bias signal BIS of the prescribed level is delivered from the changeover switch 313. As the spindle continues to rotate at a slower speed and reaches the area NCP in the environs of the predetermined rotational position (time $t_4$), the signal LS goes to the "1" level, switches $S_5$, $S_6$ are opened, and switch $S_4$ is closed. Hence, the fine position deviation signal $DV_2$ is delivered from the changeover switch 313. When the magnetic body 310a (the predetermined point on the spindle) comes within range of the predetermined rotational position, the in-position signal INPOS is generated. This is followed by the actual speed of the spindle falling to zero, whereupon the zero speed signal VZR returns to logical "1". This completes the control operation for stopping the spindle at the predetermined rotational position, the orientation completion signal ORDEN being delivered from the orientation completion signal generating circuit 414.

In the foregoing it was described that the changeover switch 313 is switched over to the side b when the actual speed of the spindle reaches zero. However, this changeover can be performed when the actual speed reaches a predetermined speed.

In accordance with the present invention as described above, a single control circuit for stopping the spindle at a predetermined rotational position is provided, and two position sensors, one for a tool change operation and one for a boring operation, are mounted on the spindle. Switching between these sensors in a suitable manner allows the spindle to be stopped with a high degree of precision at a predetermined rotational position when tools are to be changed, and at another predetermined rotational position when boring work is to be carried out. The apparatus can be simplified and reduced in cost since the single control circuit can be used to stop the spindle at the predetermined positions for both the tool change and boring operations.

Although the present invention has been described in its preferred form with a certain degree of particularity, it is obvious that many modifications and variations are possible in the light of the above teachings. It is therefore to be understood that within the scope of the appended claims, the invention may be practiced otherwise than as specifically described.

What I claim is:

1. A control system for stopping a spindle, for holding a tool for performing a boring machining operation on a workpiece at a predetermined rotational position, for driving a spindle in such a manner that a positional deviation between the present rotational position of a specified point on the spindle and a predetermined rotational position at which the specified point is to be stopped, is reduced to zero, so that the specified point on the spindle is stopped at the predetermined rotational position, said control system comprising:

a first rotational position sensor, mounted on the spindle at a first specified point thereof, for producing a first rotational position deviation signal when the tool is inserted into and withdrawn from the workpiece during the boring machining operation;

a second rotational position sensor, mounted on the spindle at a second specified point thereof, for producing a second rotational position deviation signal during the tool change operation;

changeover means, operatively connected to said first and second rotational position sensors, for selectively outputting the first rotational position deviation signal from said first rotational position sensor and the second rotational position deviation signal from said second rotational position sensor; and an orientation control circuit, operatively connected to said changeover means, for receiving the one of the first and second rotational position deviation signals selected by said changeover means and for controlling the spindle such that the spindle is stopped at the predetermined rotational position.

2. The control system according to claim 1, wherein the first and second rotational position deviation signals generated by the first and second rotational position sensors have a value of zero volts when said corresponding first and second specified points on the spindle reach the predetermined rotational position, and are positive or negative voltage signals when the respective first and second specified points on the spindle are in the vicinity of the predetermined rotational position, the polarity of the voltage depending upon whether the respective specified point on the spindle lies to the right or to the left of the predetermined rotational position.

3. The control system according to claim 1, wherein each of the first and second rotational position sensors comprises:

a magnetic body mounted on the spindle; and a sensing circuit mounted at a mechanically stationary position opposite said magnetic body, said magnetic body and said sensing circuit being arranged so that the strength of the magnetic field in said sensing circuit changes from one polarity to another in accordance with the direction of rotation of the spindle, said sensing circuit including:

means for providing a high frequency signal;

a saturable reactor having two coils oppositely wound on said saturable reactor, a first end of each of said coils being connected to a common terminal, the high-frequency signal being applied to the common terminal, the resulting output signals from the second end of each of the coils being rectified, so that a difference voltage between the rectified outputs is generated, the difference voltage serving as a rotational position deviation signal.

4. The control system according to claim 1, wherein the orientation control circuit provides a coarse rotational position deviation signal until one of the first and second specified points on the spindle reaches the vicinity of the predetermined rotational position, and provides one of said first and second rotational position deviation signals as a fine rotational position deviation signal after the corresponding specified point on the spindle reaches the predetermined rotational position, the rotation of the spindle being controlled so as to reduce to zero the difference between an average speed signal representing the actual rotational speed of the spindle, and each of the first and second rotational position deviation signals.

5. The control system according to claim 1, wherein at least one of the first and second rotational position sensors is adjustably mounted on the spindle.

6. A control system for stopping a spindle at a predetermined rotational position during a tool change operation and a boring machining operation, the spindle holding a tool, said control system comprising:

first sensor means for generating a first rotational position deviation signal when the tool is inserted into and withdrawn from the workpiece during the boring machining operation;

second sensor means for generating a second rotational position deviation signal during the tool change operation;

changeover means, operatively connected to said first and second sensor means, for selectively outputting the first and second rotational position deviation signals; and orientation control means, for receiving the one of the first and second rotational position deviation signals selected by said changeover means and for stopping the spindle at the predetermined rotational position.

7. The control system according to claim 6, wherein each of said first and second sensor means comprises:

a magnetic body mounted on the spindle; and a sensing circuit mounted opposite said magnetic body, said magnetic body and said sensing circuit arranged so that the strength of the magnetic field and said sensing circuit changes from one polarity to another in dependence upon the direction of rotation of the spindle, said sensing circuit comprising:

means for providing a high frequency signal; and reactor means, operatively connected to said means for providing a high frequency signal, for generating a difference voltage which serves as the selected one of said first and second rotational position deviation signals.

8. The control system according to claim 6, further comprising detecting means for detecting the speed of the spindle and for generating an actual speed signal, wherein the selected one of said first and second rotational position deviation signals includes an approach signal and a fine rotational position deviation signal, wherein said orientation control means comprises:

a rotational position deviation signal generating circuit, operatively connected to said detecting means and said changeover means, for receiving the actual speed signal, the approach signal and the fine rotational position deviation signal, and for generating a composite rotational position deviation signal, a zero speed signal and an orientation completion signal;

an orientation command circuit, operatively connected to said rotational position deviation signal generating circuit, for generating an orientation command signal and for receiving the orientation completion signal; and a loop changeover circuit, operatively connected to said rotational position deviation signal generating circuit and said orientation command circuit, for receiving said zero speed signal and said orientation command signal; and wherein said rotational position deviation signal generating circuit provides the approach signal until a specified point on the spindle reaches the vicinity of the predetermined rotational position, and provides said fine rotational position deviation signal after the corresponding specified point on the spindle reaches the predetermined rotational position, the rotational position deviation signal generating circuit generating said orientation completion signal when the difference between the actual speed signal and the fine position deviation signal is zero.

* * * * *

UNITED STATES PATENT AND TRADEMARK OFFICE
CERTIFICATE OF CORRECTION

PATENT NO. : 4,359,676
DATED : NOVEMBER 16, 1982
INVENTOR(S) : YOSHIKI FUJIOKA.

It is certified that error appears in the above-identified patent and that said Letters Patent is hereby corrected as shown below:

```
Front page, [57] ABSTRACT
         line 1,  "for stopping" should be --stops--;
         line 2,  ", for" should be --by--; and delete "in
                  such a";
         line 3,  "manner" should be --so--;
         line 7,  "to stop" should be --stopping--;
         line 12, after "are" insert --a--;
         line 13, "means" should be --circuit--;
         line 19, after "are" insert --selectively--;
         line 20, delete "selectively"; and "means" should be
                  --circuit--;
         line 25, "whereby" should be --so that--.
Col. 3,  line 68, "operating" should be --operation--.
Col. 4,  line 27, sprindle" should be --spindle--.
Col. 7,  line 19, delete ", and";
         line 22, "," should be --;--;
         line 24, delete "and";
         line 31, "circuity" should be --circuit--;
         line 60, "θ₂" should be --θ₁--.
Col. 9,  line 39, "specifed" should be --specified--.
```

Signed and Sealed this

Thirty-first Day of May 1983

[SEAL]

Attest:

DONALD J. QUIGG

Attesting Officer     Acting Commissioner of Patents and Trademarks